(12) United States Patent
Kuriu

(10) Patent No.: US 12,026,537 B2
(45) Date of Patent: Jul. 2, 2024

(54) SERVER INFRASTRUCTURE AND PHYSICAL CPU ALLOCATION PROGRAM

(71) Applicant: Nippon Telegraph and Telephone Corporation, Tokyo (JP)

(72) Inventor: Keiko Kuriu, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 438 days.

(21) Appl. No.: 17/427,238

(22) PCT Filed: Feb. 4, 2020

(86) PCT No.: PCT/JP2020/004195
§ 371 (c)(1),
(2) Date: Jul. 30, 2021

(87) PCT Pub. No.: WO2020/166437
PCT Pub. Date: Aug. 20, 2020

(65) Prior Publication Data
US 2022/0121468 A1 Apr. 21, 2022

(30) Foreign Application Priority Data
Feb. 13, 2019 (JP) ................. 2019-023092

(51) Int. Cl.
*G06F 9/455* (2018.01)
*G06F 9/48* (2006.01)
*G06F 9/50* (2006.01)

(52) U.S. Cl.
CPC ........ *G06F 9/45558* (2013.01); *G06F 9/4862* (2013.01); *G06F 9/505* (2013.01);
(Continued)

(58) Field of Classification Search
None
See application file for complete search history.

(56) References Cited

U.S. PATENT DOCUMENTS

2003/0140281 A1* 7/2003 Fu ................. G06F 11/1492
714/E11.008
2007/0016904 A1* 1/2007 Adlung ............ G06F 9/45545
718/1

(Continued)

OTHER PUBLICATIONS openstack.org, "CPU Topologies," retrieved on May 20, 2018, retrieved from URL <https://docs.openstack.org/nova/pike/admin/cpu-topologies.html>, 5 pages.

*Primary Examiner* — Adam Lee
(74) *Attorney, Agent, or Firm* — Fish & Richardson P.C.

(57) ABSTRACT

A CPU is allocated in view of service requirements of a virtual machine. An IaaS platform generates a virtual CPU and a virtual machine on a physical CPU of a compute node and allocates the virtual CPU to the virtual machine. This IaaS platform includes a resource allocation determination unit 32 configured to generate an instruction to cause the virtual CPU allocated to the virtual machine to occupy a physical CPU of a designated compute node in a case where load to be imposed on a process which is to run on the virtual machine is higher than a predetermined value, and generate an instruction to pin the virtual CPU at the physical CPU in a case where latency requirements of the process are stricter than a predetermined value, and generate an instruction not to pin the virtual CPU at the physical CPU in a case where the latency requirements of the process are laxer than a predetermined value, and a virtual machine generation management unit 34 configured to generate a new virtual machine on the physical CPU of the compute node in response to the instruction from the resource allocation determination unit.

6 Claims, 10 Drawing Sheets

(52) U.S. Cl.
CPC .. *G06F 9/5077* (2013.01); *G06F 2009/45562* (2013.01); *G06F 2009/4557* (2013.01)

(56) References Cited

U.S. PATENT DOCUMENTS

| | | | |
|---|---|---|---|
| 2008/0183996 A1* | 7/2008 | Field | G06F 9/468 711/163 |
| 2008/0184227 A1* | 7/2008 | Matsumoto | G06F 9/5077 718/1 |
| 2012/0239850 A1* | 9/2012 | Qiu | G06F 9/45558 711/6 |
| 2015/0058861 A1* | 2/2015 | Zheng | G06F 9/50 718/104 |
| 2015/0331715 A1* | 11/2015 | Sathyanarayana | G06F 9/5055 718/1 |
| 2016/0147553 A1* | 5/2016 | Palavalli | G06F 21/121 718/1 |
| 2018/0101486 A1* | 4/2018 | Lu | G06F 9/4812 |
| 2018/0365163 A1* | 12/2018 | Das | G06F 12/1027 |
| 2019/0121659 A1* | 4/2019 | van Riel | G06F 9/4843 |

* cited by examiner

PRIOR ART

SERVER INFRASTRUCTURE AND PHYSICAL CPU ALLOCATION PROGRAM

CROSS-REFERENCE TO RELATED APPLICATIONS

This application is a National Stage application under 35 U.S.C. § 371 of International Application No. PCT/JP2020/004195, having an International Filing Date of Feb. 4, 2020, which claims priority to Japanese Application Serial No. 2019-023092, filed on Feb. 13, 2019. The disclosure of the prior application is considered part of the disclosure of this application, and is incorporated in its entirety into this application.

TECHNICAL FIELD

The present invention relates to a server platform and a physical CPU allocation program for constructing and running a computer system.

BACKGROUND ART

FIG. 7 is a configuration diagram of an infrastructure as a service (IaaS) platform for constructing and running a network service.

An IaaS platform 1 for constructing and running a network service is implemented as a server platform. A plurality of applications 2a to 2i share resources of this IaaS platform 1, such as a bare metal 11, a virtual machine 12, a container 13, an object storage 14, a file storage 15 and a block storage 16.

Each of the applications 2a to 2i can provide service to outside and can utilize a necessary amount of the resources of the IaaS platform 1. The IaaS platform 1 has an advantage of being capable of running a plurality of types of service by the applications 2a to 2i. Meanwhile, resources which can be utilized by the applications 2a to 2i are limited as a result of the resources of the IaaS platform 1 being shared.

CITATION LIST

Non-Patent Literature

Non-Patent Literature 1: "CPU topologies", [online], Accessed Jan. 31, 2019, Internet, Retrieved from: docs.openstack.org

SUMMARY OF THE INVENTION

Technical Problem

Non-Patent Literature 1 discloses CPU pinning (fixing) features in OpenStack. CPU pinning refers to limiting a physical CPU to be used by a virtual CPU for each virtual CPU allocated to a virtual machine. In other words, CPU pinning refers to fixing a physical CPU to be allocated to processing of the virtual CPU.

CPU pinning avoids processing of the virtual CPU from being executed by other physical CPUs, so that it is possible to prevent lowering of a cache hit ratio and execute a process for which latency requirements are strict without delay. OpenStack supports CPU pinning using a dedicated policy in which a virtual CPU is pinned at one physical CPU and occupies the physical CPU.

In a case of service for which latency requirements are strict, by applying the dedicated policy to the virtual CPU, it is possible to prevent lowering of the cache hit ratio and achieve low latency of the service.

While the dedicated policy fits service for which a certain level of performance requirements such as imposition of high load is demanded, there is a possibility that excess resources may occur in a case of service for which latency requirements are not strict.

Further, OpenStack includes a shared policy in which a plurality of virtual CPUs share a physical CPU. With this shared policy, a virtual CPU cannot be pinned, so that processes are mixed with processes of other virtual CPUs.

An object of the present invention is therefore to enable allocation of a physical CPU in view of service requirements of a virtual machine.

Means for Solving the Problem

To achieve the above-described object, an invention recited in claim 1 is a server platform which generates a virtual CPU and a virtual machine on a physical CPU of a compute node and allocates the virtual CPU to the virtual machine, the server platform including a resource allocation determination unit configured to generate one of an instruction to cause the virtual CPU allocated to the virtual machine to share a physical CPU, an instruction to cause the virtual CPU to occupy a physical CPU and to be pinned at the physical CPU, and an instruction to cause the virtual CPU to occupy a physical CPU and not to be pinned at the physical CPU, and a virtual machine generation management unit configured to generate a new virtual machine on the physical CPU of the compute node in response to the instruction from the resource allocation determination unit.

Such a configuration enables allocation of the physical CPU in view of service requirements of the virtual machine.

An invention recited in claim 2 is the server platform recited in claim 1, in which the resource allocation determination unit generates an instruction to cause the virtual CPU allocated to the virtual machine to share a physical CPU in a case where load to be imposed on a process which is to run on the virtual machine is equal to or less than a predetermined value, generates an instruction to cause the virtual CPU allocated to the virtual machine to occupy the physical CPU of a designated compute node in a case where the load to be imposed on the process is higher than a predetermined value, generates an instruction to pin the virtual CPU at the physical CPU in a case where a latency requirement of the process is stricter than the predetermined value, and generates an instruction not to pin the virtual CPU at the physical CPU in a case where the latency requirement of the process is laxer than a predetermined value.

Such a configuration enables allocation of the physical CPU in view of the load requirement and the latency requirement to be imposed on the process which is to run on the virtual machine.

An invention recited in claim 3 is the server platform recited in claim 1 or 2, in which in a case where there is no available physical CPU of the compute node and the compute node includes an unpinned physical CPU which is occupied by one of virtual CPUs, the resource allocation determination unit generates an instruction to migrate a virtual machine allocated to a virtual CPU which occupies the physical CPU to a physical CPU of another compute node, and the virtual machine generation management unit migrates the virtual machine to the physical CPU of the other compute node in response to the instruction from the resource allocation determination unit and generates a new virtual machine on the physical CPU of the compute node.

Such a configuration enables generation of the virtual machine even in a case where the physical CPU on the designated compute node is not available.

An invention recited in claim 4 is the server platform recited in claim 1 or 2, in which in a case where there is no available physical CPU of the compute node and the compute node includes an unpinned physical CPU which is occupied by one of virtual CPUs, the virtual machine generation management unit migrates the virtual machine allocated to the virtual CPU which occupies the physical CPU to another compute node and generates a new virtual machine on the physical CPU of the compute node.

Such a configuration enables generation of the virtual machine even in a case where the physical CPU on the designated compute node is not available.

An invention recited in claim 5 is a physical CPU allocation program for a virtual CPU by a server platform which generates a virtual CPU and a virtual machine on a physical CPU of a compute node and allocates the virtual CPU to the virtual machine, the physical CPU allocation program causing a computer to execute a step of generating one of an instruction to cause the virtual CPU allocated to the virtual machine to share a physical CPU, an instruction to cause the virtual CPU to occupy a physical CPU and to be pinned at the physical CPU, and an instruction to cause the virtual CPU to occupy a physical CPU and not to be pinned at the physical CPU, and a step of generating a new virtual machine on the physical CPU of the compute node.

Such a configuration enables allocation of the physical CPU in view of service requirements of the virtual machine.

An invention recited in claim 6 is the physical CPU allocation program recited in claim 5, for causing the computer to execute a step of generating an instruction to cause the virtual CPU allocated to the virtual machine to share a physical CPU in a case where load to be imposed on a process which is to run on the virtual machine is equal to or less than a predetermined value, and generating an instruction to cause the virtual CPU allocated to the virtual machine to occupy the physical CPU of a designated compute node in a case where load to be imposed on the process is higher than a predetermined value, and a step of generating an instruction to pin the virtual CPU at the physical CPU in a case where a latency requirement of the process is stricter than the predetermined value and generating an instruction not to pin the virtual CPU at the physical CPU in a case where the latency requirement of the process is laxer than a predetermined value.

Such a configuration enables allocation of the physical CPU in view of the load requirement and the latency requirement to be imposed on the process which is to run on the virtual machine.

An invention recited in claim 7 is the physical CPU allocation program recited in claim 5 or 6, for causing the computer to execute a step of, in a case where there is no available physical CPU of the compute node and the compute node includes an unpinned physical CPU which is occupied by one of virtual machines, generating an instruction to migrate the virtual machine allocated to the virtual CPU which occupies the physical CPU to a physical CPU of another compute node, and a step of migrating the virtual machine to the physical CPU of the other compute node and generating a new virtual machine on the physical CPU of the compute node.

Such a configuration enables generation of the virtual machine even in a case where the physical CPU on the designated compute node is not available.

An invention recited in claim 8 is the physical CPU allocation program recited in claim 5 or 6, for causing the computer to execute a step of, in a case where there is no available physical CPU of the compute node and the compute node includes an unpinned physical CPU which is occupied by one of virtual CPUs, migrating the virtual machine allocated to the virtual CPU which occupies the physical CPU to another compute node and generating a new virtual machine on the physical CPU of the compute node.

Such a configuration enables generation of the virtual machine even in a case where there is no available physical CPU on the designated compute node.

Effects of the Invention

It becomes possible to allocate a physical CPU in view of service requirements of a virtual machine.

DESCRIPTION OF EMBODIMENTS

A comparative example and an embodiment for implementing the present invention will be described in detail below with reference to the drawings.

Figure 1:
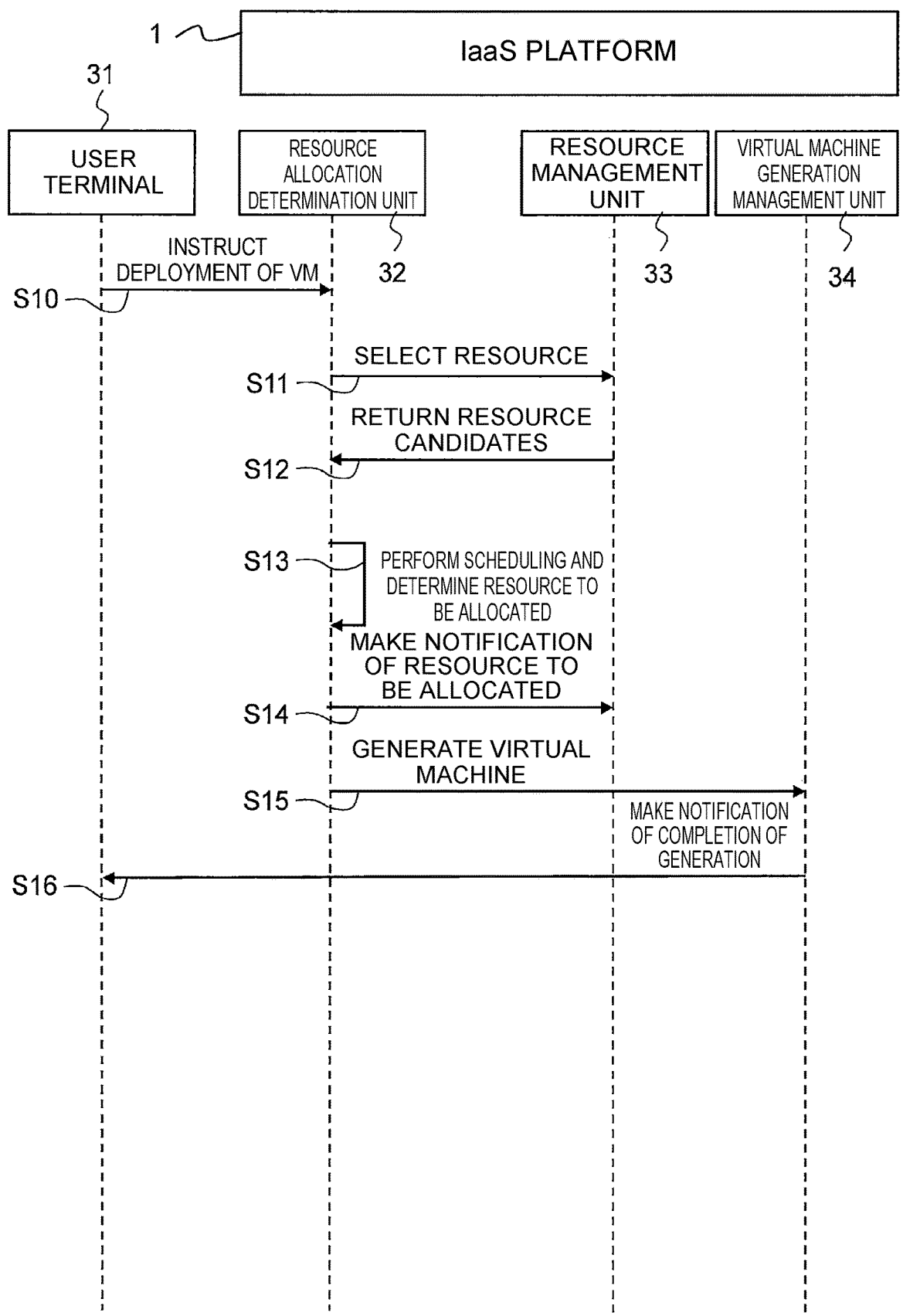
FIG. 1 is a sequence diagram in a case where a virtual machine is deployed on a NUMA including a physical CPU from a user terminal.

FIG. 1 is a sequence diagram in a case where a virtual machine is deployed on a non-uniform memory access (NUMA) including a physical CPU from a user terminal. This sequence diagram will be used in common to describe the comparative example which will be described later and the embodiment.

An IaaS platform 1 includes a resource allocation determination unit 32 which executes each sequence, a resource management unit 33, and a virtual machine generation management unit 34. This IaaS platform 1 includes a plurality of server computers. A subject which executes each sequence is embodied by the computers executing a physical CPU allocation program.

When deployment of a virtual machine (VM) is instructed in step S10, a user terminal 31 designates a pinning pattern for each virtual CPU. Note that pinning patterns of the virtual CPU in the comparative example include two patterns of a pattern of causing a virtual CPU to occupy a physical CPU and to be pinned at the physical CPU, and a pattern of causing a virtual CPU to share a physical CPU. In contrast, the pinning patterns of the virtual CPU in the present embodiment include three patterns of a pattern of causing a virtual CPU to occupy a physical CPU and to be pinned at the physical CPU, a pattern of causing a virtual CPU to occupy a physical CPU and not to be pinned at the physical CPU, and a pattern of causing a virtual CPU to share a physical CPU.

The resource allocation determination unit 32 then instructs the resource management unit 33 to select a resource (S11). The resource management unit 33 returns resource candidates to the resource allocation determination unit 32 (S12). In step S13, the resource allocation determination unit 32 performs scheduling and determines a resource to be allocated.

Thereafter, the resource allocation determination unit 32 notifies the resource management unit 33 of the resource to be allocated (S14) and instructs the virtual machine generation management unit 34 to generate a virtual machine (S15).

In response to this instruction, the virtual machine generation management unit 34 generates a virtual machine and allocates the resource on the basis of the scheduling determined in step S13.

In step S16, the virtual machine generation management unit 34 notifies the user terminal 31 of completion of generation of the virtual machine and ends the processing in FIG. 1.

By this means, the IaaS platform 1 can generate a virtual CPU and a virtual machine on a physical CPU of a compute node and can allocate the virtual CPU to this virtual machine.

Processing in Comparative Example

A pinning policy in the comparative example includes two patterns of a pattern of causing a virtual CPU to occupy a physical CPU and to be pinned at the physical CPU, and a pattern of causing a virtual CPU to share a physical CPU.

The pattern of causing a virtual CPU to occupy a physical CPU and to be pinned at the physical CPU is, for example, applied to service in which high load is imposed. The pattern of causing a virtual CPU to share the physical CPU is, for example, applied to service in which high load is not imposed.

Figure 8:
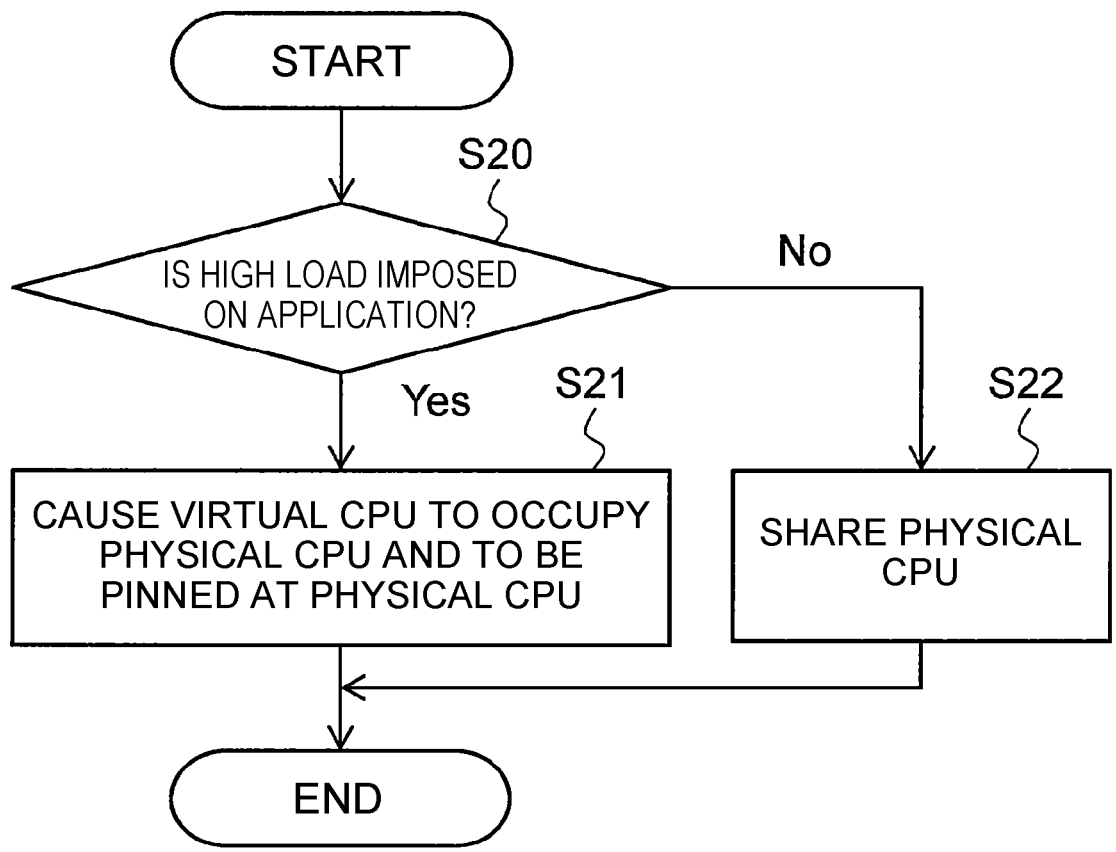
FIG. 8 is a flowchart of selection of a pinning pattern from application requirements in a comparative example.

FIG. 8 is a flowchart in which the user terminal 31 selects a pinning pattern from application requirements in the comparative example.

Before step S10 in FIG. 1 is executed, the user terminal 31 executes processing of selecting a pinning pattern from the application requirements.

First, the user terminal 31 determines whether high load is to be imposed on the application (S20).

In a case where high load is to be imposed on the application (Yes), the user terminal 31 selects the pattern of causing a virtual CPU to occupy a physical CPU and to be pinned at the physical CPU for the virtual CPU allocated to the virtual machine relating to this application (S21) and ends the processing in FIG. 8.

In a case where high load is not to be imposed on the application (No), the user terminal 31 selects the pattern of causing a virtual CPU to share a physical CPU with other virtual CPUs for the virtual CPU allocated to the virtual machine relating to this application (S22) and ends the processing in FIG. 8.

Note that processing of selecting a pinning pattern may be executed by the IaaS platform instead of the user terminal 31.

Figure 9:
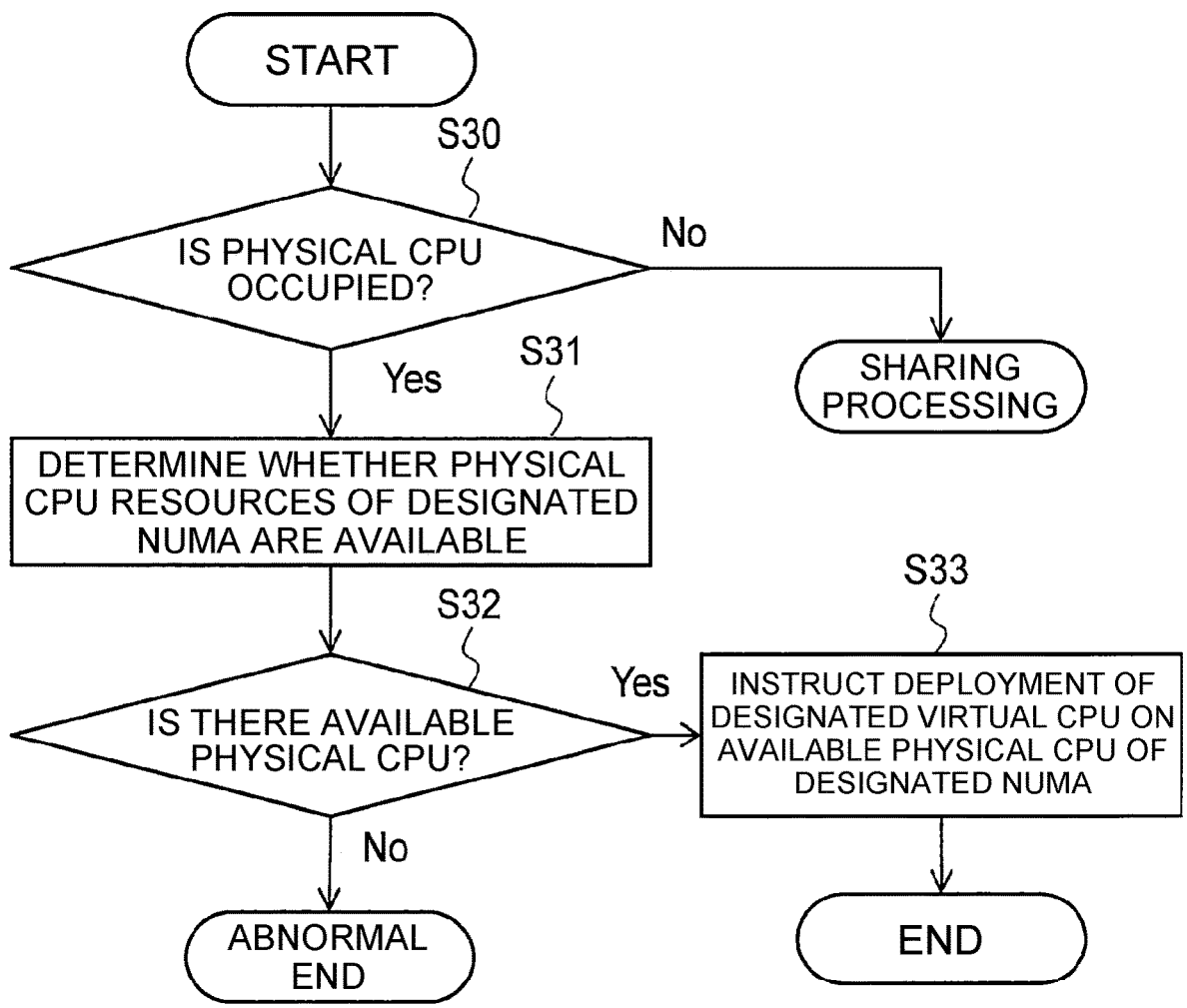
FIG. 9 is a flowchart of construction of a virtual CPU which causes a virtual machine to operate on the basis of the pinning pattern in the comparative example.

FIG. 9 is a flowchart of generation of an instruction to construct a virtual CPU which causes a virtual machine to operate on the basis of the pattern in the comparative example. This processing in FIG. 9 is executed in step S13 in FIG. 1.

The resource allocation determination unit 32 determines whether or not the pattern is the pattern of causing a virtual CPU to occupy a physical CPU (S30). In a case where the pattern is not the pattern of causing a virtual CPU to occupy a physical CPU (No), the resource allocation determination unit 32 executes processing relating to sharing of the physical CPU.

In a case where the pattern is the pattern of causing a virtual CPU to occupy a physical CPU (Yes), the resource allocation determination unit 32 determines whether there are available physical CPU resources of the designated NUMA (S31). In a case where there are available physical CPU resources of the designated NUMA (Yes), the resource allocation determination unit 32 instructs deployment of the designated virtual CPU on the available physical CPU of the designated NUMA (S33) and ends the processing in FIG. 9.

In a case where there are no available physical CPU resources of the designated NUMA (No), the resource allocation determination unit 32 cannot deploy the virtual machine on the designated NUMA, and thus, abnormally ends the processing in FIG. 9.

Figure 10:
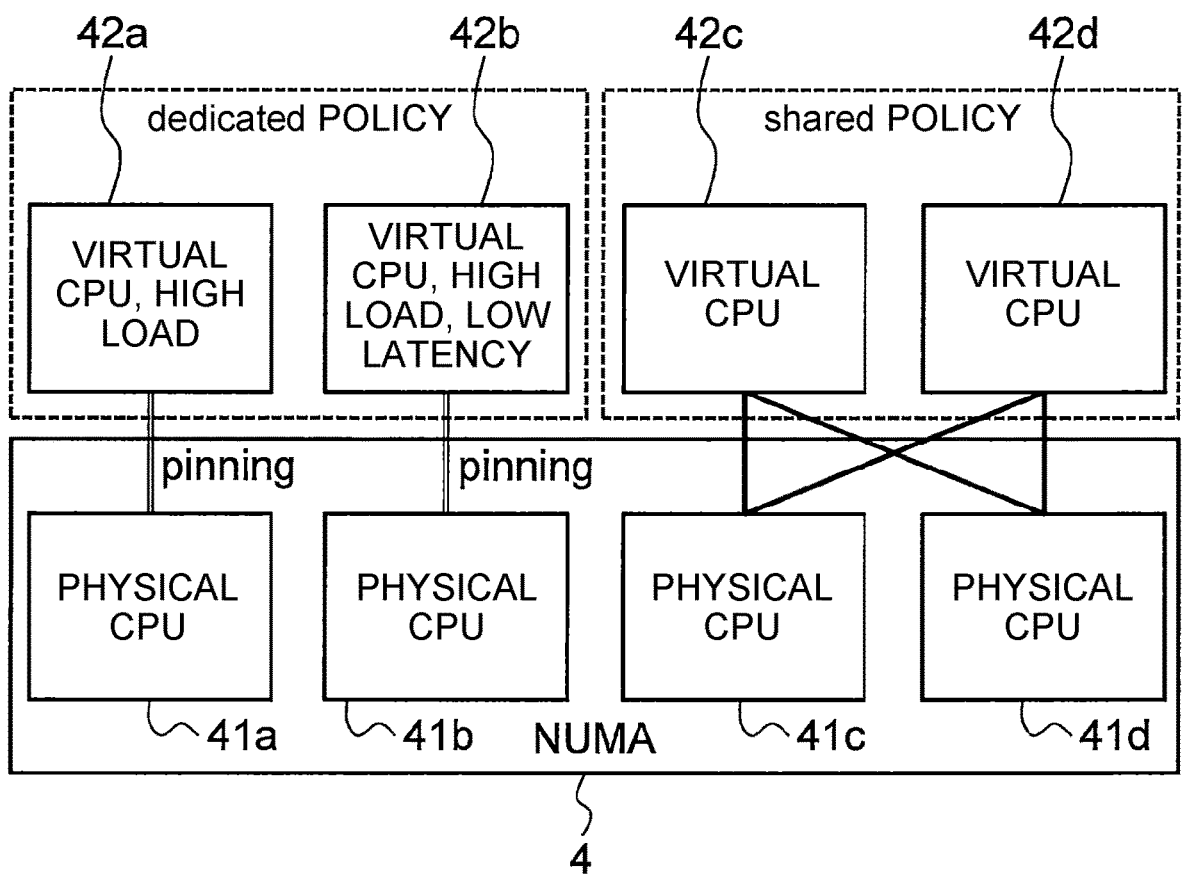
FIG. 10 is a view illustrating a system constructed using a pinning policy in the comparative example.

FIG. 10 is a view illustrating a system constructed using a pinning policy in the comparative example. An NUMA 4 includes four physical CPUs 41a to 41d. The physical CPU 41a is occupied and pinned by a virtual CPU 42a allocated to a virtual machine on which high load is imposed.

The physical CPU 41b is occupied and pinned by a virtual CPU 42b allocated to a virtual machine on which high load is imposed and for which low latency is required. FIG. 10 indicates the virtual CPUs 42a and 42b as CPUs employing a dedicated policy to indicate this situation.

Physical CPUs 41c and 41d are shared by virtual CPUs 42c and 42d. In other words, a pattern of causing a virtual CPU to share a physical CPU is employed at the physical CPUs 41c and 41d. FIG. 10 indicates the virtual CPUs 42c and 42d as CPUs employing a shared policy to indicate this situation.

Even if it is tried to deploy a virtual CPU allocated to a virtual machine on which high load is imposed and for which low latency is required, for this system, there is a problem that physical CPU resources are not available, and thus, this virtual machine and the virtual CPU cannot be deployed.

Processing in the Present Embodiment

The present embodiment expands the pinning policy in the comparative example and adds a pattern of causing a virtual CPU to occupy a physical CPU and not to be pinned at the physical CPU. Addition of this pattern enables allocation of a CPU in view of service requirements of the virtual machine.

The pattern of causing a virtual CPU to occupy a physical CPU and to be pinned at the physical CPU is applied to service which is desired to be processed as top priority processing. This pattern is, for example, applied to service on which high load is to be imposed and for which low latency is required. Here, requirements of low latency refer to strict latency requirements. In contrast, service for which only imposition of high load is required refers to service for which latency requirements are lax.

In the pattern of causing a virtual CPU to occupy a physical CPU and not to be pinned at the physical CPU, there is a case where a physical CPU to be allocated may be changed by another service with higher priority. This pattern is, for example, applied to service for which imposition of high load is required. Addition of this pattern enables allocation of a CPU further in view of service requirements of the virtual machine.

Figure 2:
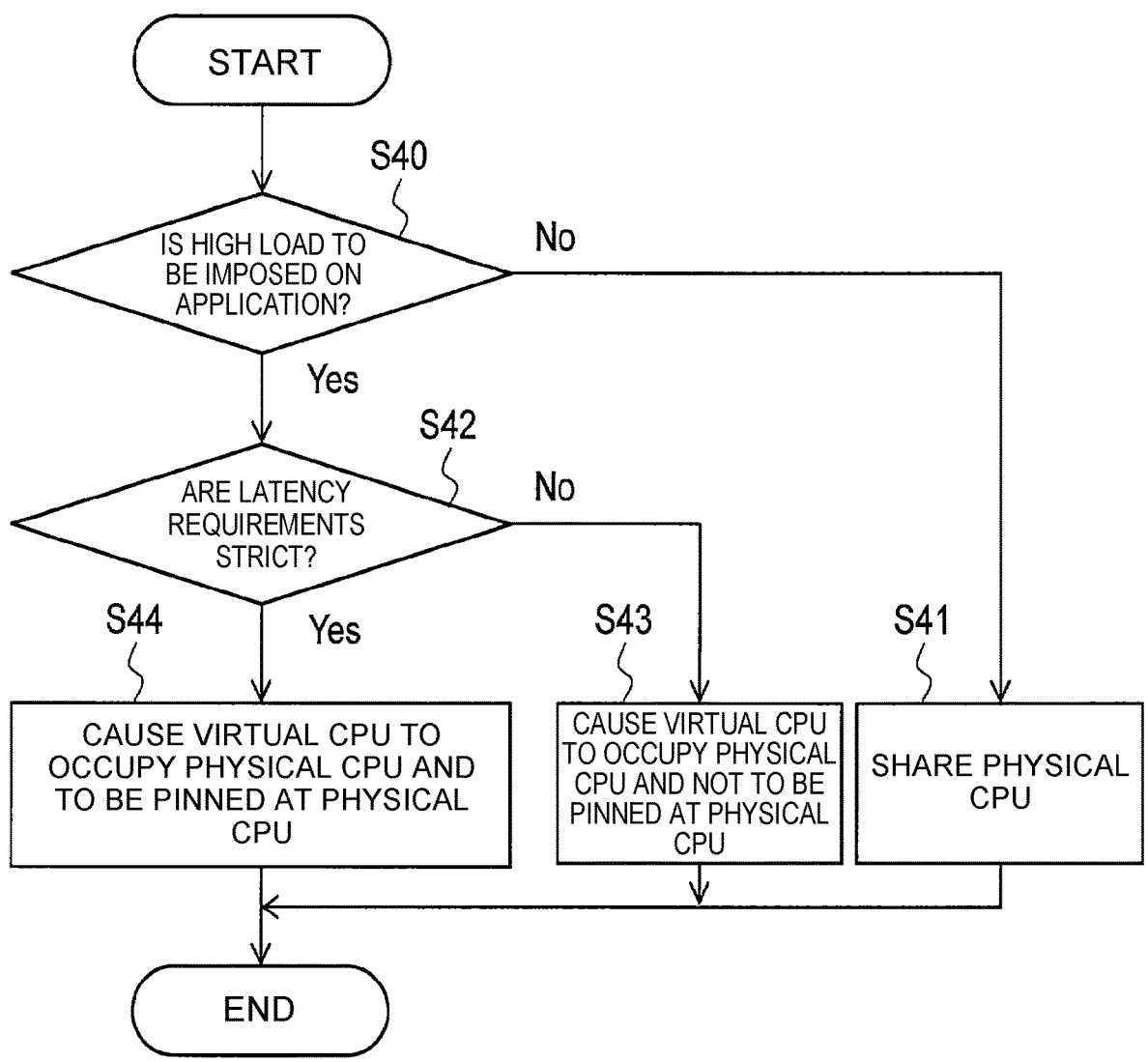
FIG. 2 is a flowchart of selection of a pinning pattern from application requirements in the present embodiment.

FIG. 2 is a flowchart of selection of a pinning pattern from application requirements in the present embodiment.

The user terminal 31 determines whether or not high load is to be imposed on the application (S40).

In a case where high load is not to be imposed on the application (No), the user terminal 31 selects the pattern of causing a virtual CPU to share a physical CPU with other virtual CPUs for the virtual CPU allocated to the virtual machine relating to this application (S41) and ends the processing in FIG. 2.

In a case where high load is to be imposed on the application (Yes), the user terminal 31 determines whether or not the application requires low latency (S42). In step S42, in a case where the latency requirements of the application are strict (Yes), the user terminal 31 selects the pattern of causing a virtual CPU to occupy a physical CPU and to be pinned at the physical CPU for the virtual CPU allocated to the virtual machine relating to this application (S44) and ends the processing in FIG. 2.

In step S42, in a case where the latency requirements of the application are not strict (No), the user terminal 31 selects the pattern of causing a virtual CPU to occupy a physical CPU and not to be pinned at the physical CPU (S43) and ends the processing in FIG. 2. In other words, the user terminal 31 selects the pattern of causing a virtual CPU to occupy a physical CPU and not to be pinned at the physical CPU in a case where the latency requirements of the application are lax.

Figure 3:
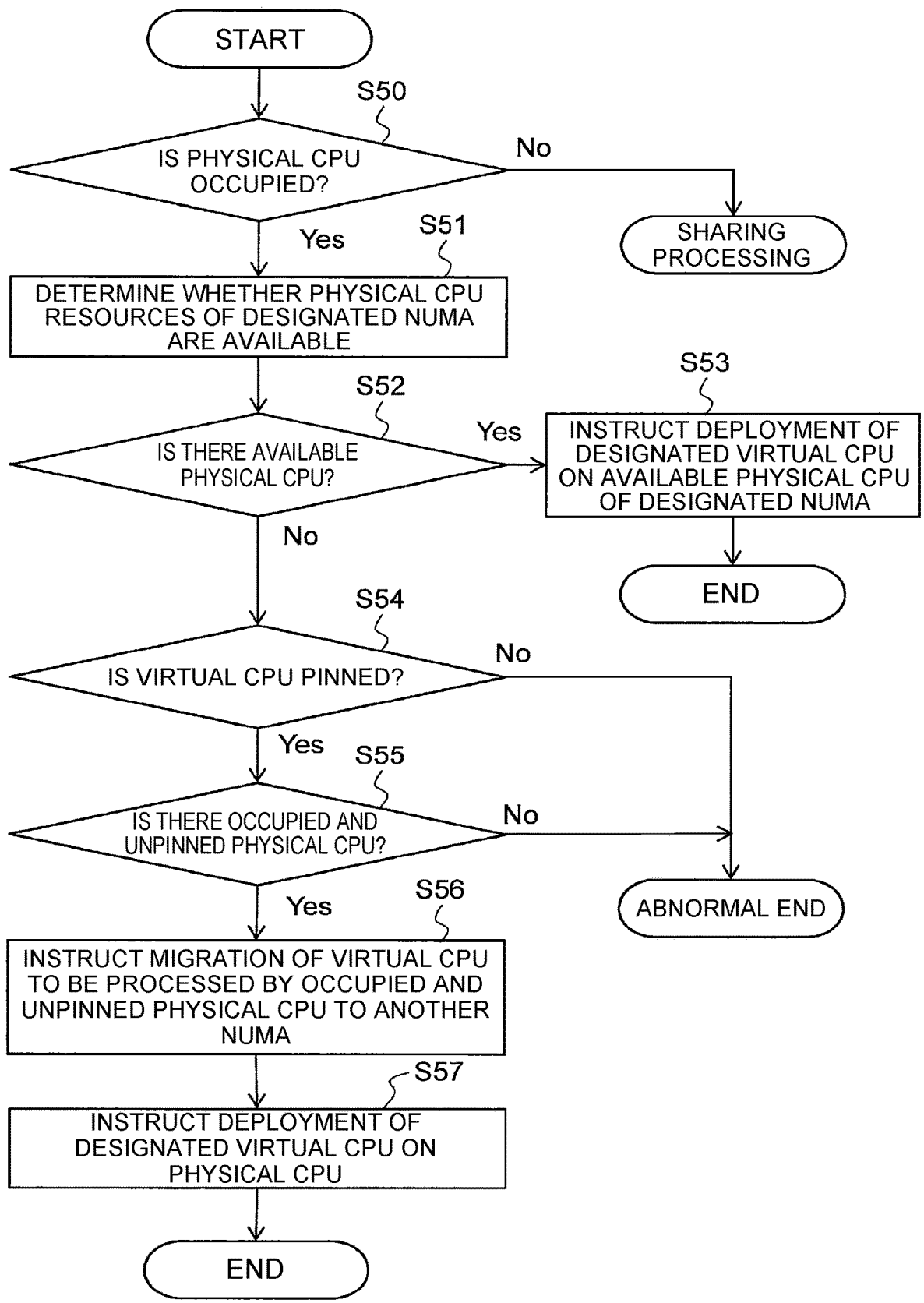
FIG. 3 is a flowchart of construction of a virtual CPU which causes a virtual machine to operate on the basis of the pinning pattern in the present embodiment.

FIG. 3 is a flowchart of construction of a virtual CPU which causes a virtual machine to operate on the basis of the pinning pattern in the present embodiment.

The processing in FIG. 3 is executed in step S13 in FIG. 1.

The resource allocation determination unit 32 determines whether or not the pattern is the pattern of causing a virtual CPU to occupy a physical CPU (S50). In a case where the pattern is not the pattern of causing a virtual CPU to occupy a physical CPU (No), the resource allocation determination unit 32 executes processing relating to sharing of the physical CPU.

In a case where the pattern is the pattern of causing a virtual CPU to occupy a physical CPU (Yes), the resource allocation determination unit 32 determines whether there are available physical CPU resources of the designated NUMA (S51).

In step S52, in a case where there are available physical CPU resources of the designated NUMA (Yes), the resource allocation determination unit 32 instructs deployment of the designated virtual CPU on the available physical CPU of the designated NUMA (S53) and ends the processing in FIG. 3.

In step S52, in a case where there are no available physical CPU resources of the designated NUMA (No), the resource allocation determination unit 32 determines whether or not the pattern is the pattern of causing a virtual CPU to be pinned at a physical CPU (S54).

In a case where the pattern is not the pattern of causing a virtual CPU to be pinned at a physical CPU (No), the resource allocation determination unit 32 abnormally ends the processing, while in a case where the pattern is the pattern of causing a virtual CPU to be pinned at a physical CPU (Yes), the processing proceeds to processing in step S55.

In step S55, the resource allocation determination unit 32 determines whether or not the designated NUMA includes an occupied and unpinned physical CPU. In a case where the designated NUMA does not include an occupied and unpinned physical CPU (No), the resource allocation determination unit 32 abnormally ends the processing, while in a case where the designated NUMA includes an occupied and unpinned physical CPU (Yes), the processing proceeds to processing in step S56.

In step S56, the resource allocation determination unit 32 gives an instruction to migrate the virtual CPU which is processed by an occupied and unpinned physical CPU to another NUMA. Further, the resource allocation determination unit 32 gives an instruction to deploy the virtual CPU on the physical CPU (S57) and ends the processing in FIG. 3.

Figure 4:
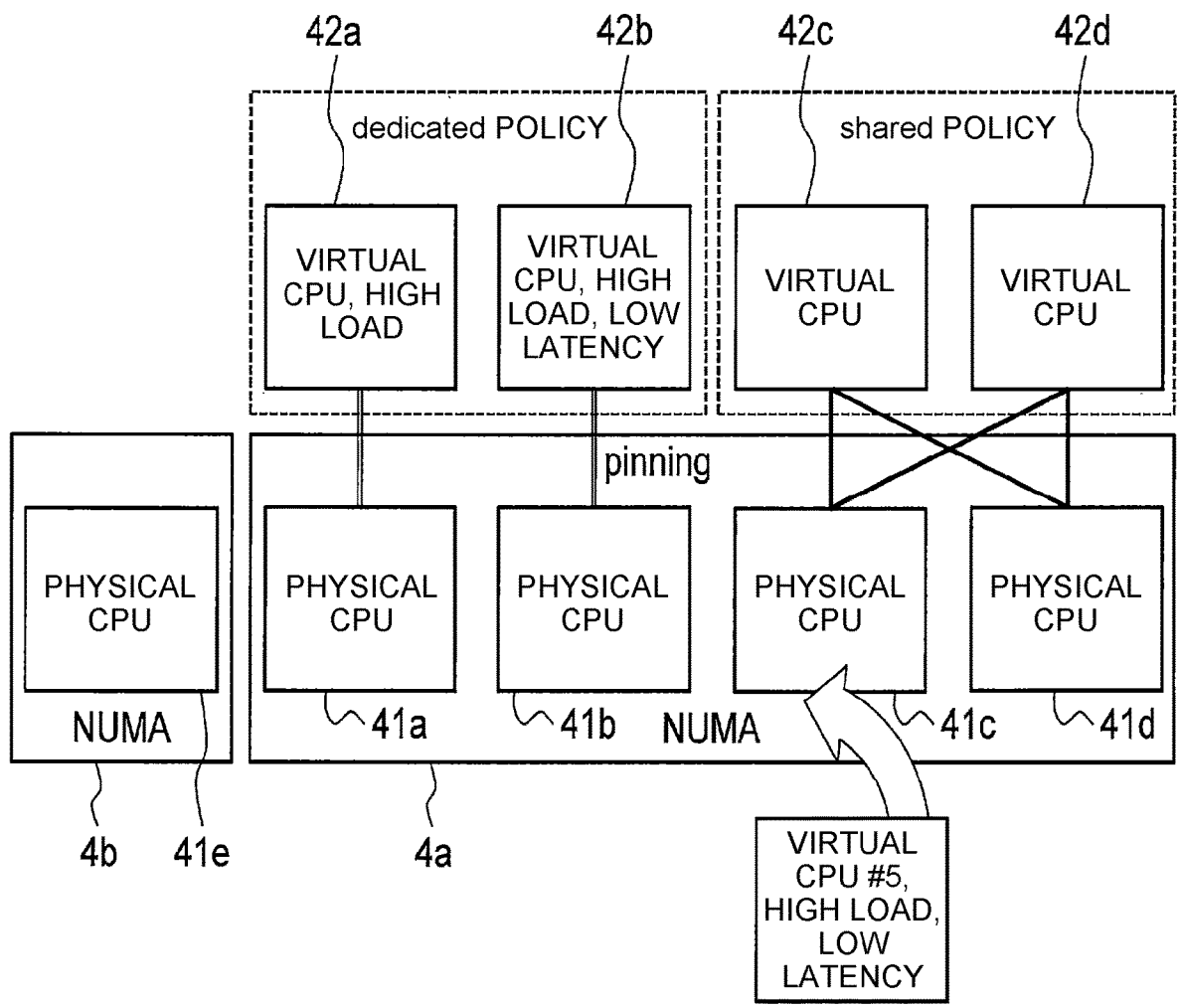
FIG. 4 is a view illustrating an initial state of a system constructed using a pinning policy of the present embodiment.

FIG. 4 is a view illustrating an initial state of the system constructed using the pinning policy in the present embodiment.

An NUMA 4b includes one physical CPU 41e. This physical CPU 41e is available.

An NUMA 4a includes four physical CPUs 41a to 41d. The physical CPU 41a is occupied by the virtual CPU 42a allocated to a virtual machine on which high load is imposed, but not pinned. In other words, the pattern of causing a virtual CPU to occupy a physical CPU and not to be pinned at the physical CPU is employed at the physical CPU 41a.

The physical CPU 41b is occupied and pinned by the virtual CPU 42b on which high load is imposed and for which low latency is required. In other words, the pattern of causing a virtual CPU to occupy a physical CPU and to be pinned at the physical CPU is employed at the physical CPU 41b. FIG. 4 indicates the virtual CPUs 42a and 42b as CPUs employing a dedicated policy to indicate this situation.

The physical CPUs 41c and 41d are shared by the virtual CPUs 42c and 42d. In other words, the pattern of causing a virtual CPU to share a physical CPU is employed at the physical CPUs 41c and 41d. FIG. 4 indicates the virtual CPUs 42c and 42d as CPUs employing a shared policy to indicate this situation.

Figure 5:
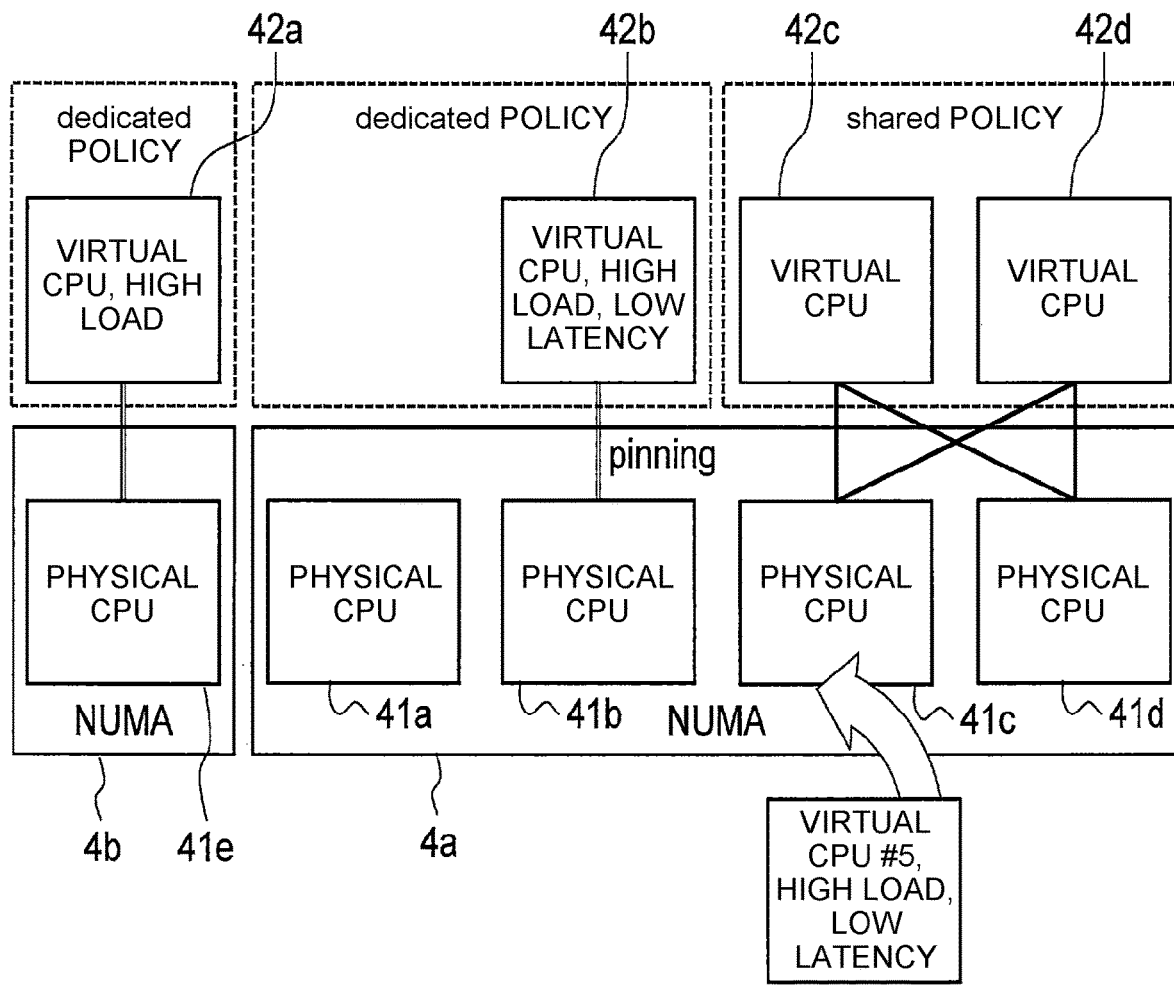
FIG. 5 is a view illustrating a state of the system constructed using the pinning policy in the present embodiment after migration.

FIG. 5 is a view illustrating a state of the system constructed using the pinning policy in the present embodiment after migration. FIG. 5 illustrates a state after the processing in step S56 in FIG. 3 ends.

The virtual CPU 42a which has occupied the physical CPU 41a in FIG. 4 is migrated to the physical CPU 41e provided at the NUMA 4b in FIG. 5. Then, the physical CPU 41a becomes available. States of other physical CPUs 41b to 41d are similar to the initial state illustrated in FIG. 4.

Figure 6:
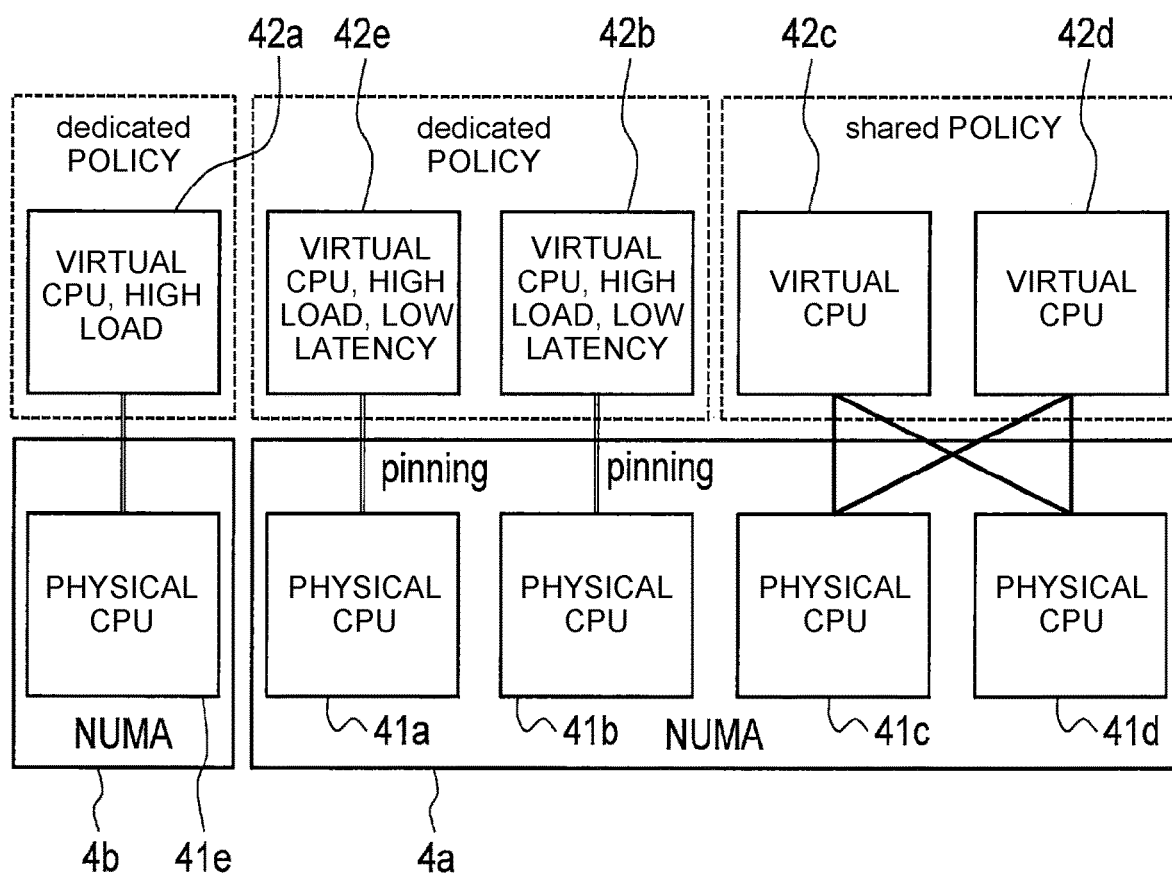
FIG. 6 is a view illustrating a state of the system constructed using the pinning policy in the present embodiment after deployment.
Figure 7:
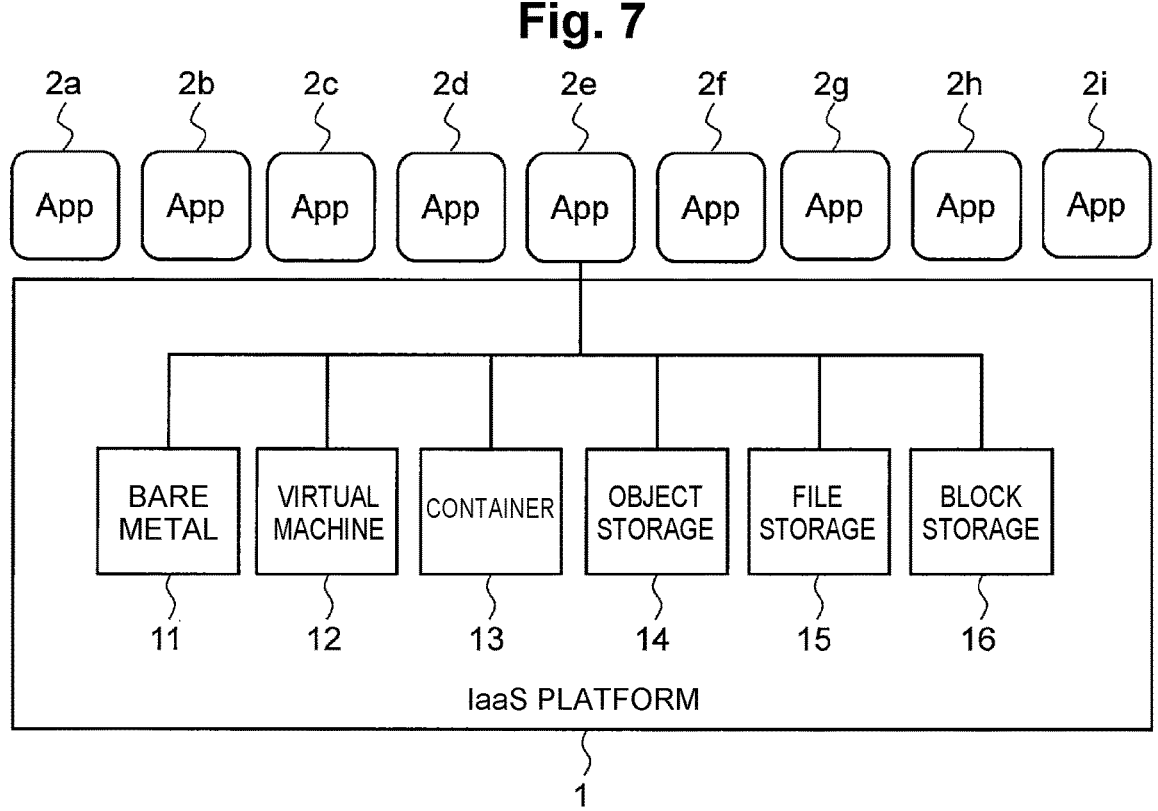
FIG. 7 is a configuration diagram of an IaaS platform which constructs and runs network service.

FIG. 6 is a view illustrating a state of the system constructed using the pinning policy in the present embodiment after deployment. FIG. 6 illustrates a state after flow of the flowchart in FIG. 3 ends.

A virtual CPU 42e is deployed in FIG. 6 on the physical CPU 41a which is available in FIG. 5. The physical CPU 41a is occupied and pinned by the virtual CPU 42e allocated to a virtual machine on which high load is imposed and for which low latency is required.

Modified Example

The present invention is not limited to the above-described embodiment, and various modifications such as, for example, the following (a) to (c) can be made within a range not deviating from the gist of the present invention.

(a) The number of physical CPUs provided at the NUMA is not limited to four. Further, the number of virtual CPUs to be deployed on each physical CPU is not limited to one or two.

(b) It is not only the user terminal that determines whether or not to occupy a physical CPU and whether or not to pin a virtual CPU at a physical CPU in accordance with load to be imposed on the application and latency. The IaaS platform may determine whether or not to occupy a physical CPU and whether or not to pin a virtual CPU at a physical CPU in accordance with load to be imposed on the application and latency.

(c) It is not only the resource allocation determination unit that determines to migrate a virtual CPU which occupies a physical CPU on an NUMA. In a case where the physical CPU on the NUMA is not available, the virtual machine generation management unit migrates the virtual CPU which occupies the physical CPU to put this physical CPU into an available state and deploys (generates) a virtual machine.

REFERENCE SIGNS LIST

1 IaaS platform (server platform)
11 Bare metal
12 Virtual machine
13 Container
14 Object storage
15 File storage
16 Block storage
2a to 2i Application
31 User terminal
32 Resource allocation determination unit
33 Resource management unit
34 Virtual machine generation management unit
4, 4a, 4b NUMA
41a to 41e Physical CPU
42a to 42e Virtual CPU

The invention claimed is:

1. A server platform comprising a computer configured to:
generate a virtual CPU and a virtual machine on a first physical CPU of a compute node;
allocate the virtual CPU to the virtual machine;
generate a first instruction to cause the virtual CPU allocated to the virtual machine to occupy a second physical CPU of a designated compute node and to be pinned at the second physical CPU in a case where a load to be imposed on a process which is to execute on the virtual machine is higher than a threshold load value and an acceptable latency for the process is lower than a threshold latency value;
generate a second instruction to cause the virtual CPU allocated to the virtual machine to occupy the second physical CPU of the designated compute node and not to be pinned at the second physical CPU in a case where the load to be imposed on the process is higher than the threshold load value and the acceptable latency for the process is higher than the threshold latency value;
generate a new virtual machine on the first physical CPU of the compute node based on the first instruction or the second instruction; and
allocate the virtual CPU to the new virtual machine.

2. The server platform according to claim 1,
wherein in a case where there is no available physical CPU of the compute node and the compute node includes an unpinned physical CPU which is occupied by at least one virtual CPU, the computer is configured to generate an instruction to migrate the virtual machine allocated to the virtual CPU which occupies the physical CPU to a physical CPU of another compute node, and the computer is configured to migrate the virtual machine to the physical CPU of the other compute node in response to the instruction and generate a new virtual machine on the physical CPU of the compute node.

3. The server platform according to claim 1,
wherein in a case where there is no available physical CPU of the compute node and the compute node includes an unpinned physical CPU which is occupied by at least one virtual CPU, the computer is configured generate an instruction to migrate the virtual machine allocated to the virtual CPU which occupies the physical CPU to another compute node and generate a new virtual machine on the physical CPU of the compute node.

4. A non-transitory computer-readable storage medium storing a program that when executed by a computer causes the computer to:
generate a virtual CPU and a virtual machine on a first physical CPU of a compute node;
allocate the virtual CPU to the virtual machine;
generate a first instruction to cause the virtual CPU allocated to the virtual machine to occupy a second physical CPU of a designated compute node and to be pinned at the second physical CPU in a case where a load to be imposed on a process which is to execute on the virtual machine is higher than a threshold load value and an acceptable latency for the process is lower than a threshold latency value;
generate a second instruction to cause the virtual CPU allocated to the virtual machine to occupy the second physical CPU of the designated compute node and not to be pinned at the second physical CPU in a case where the load to be imposed on the process is higher than the threshold load value and the acceptable latency for the process is higher than the threshold latency value;
generate a new virtual machine on the first physical CPU of the compute node based on the first instruction or the second instruction; and
allocate the virtual CPU to the new virtual machine.

5. The non-transitory computer-readable medium according to claim 4, wherein:
in a case where there is no available physical CPU of the compute node and the compute node includes an unpinned physical CPU which is occupied by at least one virtual CPU, the executed program causes the computer to generate generating an instruction to migrate the virtual machine allocated to the virtual CPU which occupies the physical CPU to a physical CPU of another compute node; and
the executed program causes the computer to migrate the virtual machine to the physical CPU of the other compute node and generate a new virtual machine on the physical CPU of the compute node in response to the instruction.

6. The non-transitory computer-readable medium according to claim 4, wherein:
in a case where there is no available physical CPU of the compute node and the compute node includes an unpinned physical CPU which is occupied by at least one virtual CPU, the executed program causes the computer to migrate a virtual machine allocated to a virtual CPU which occupies the physical CPU to another compute node and generate a new virtual machine on the physical CPU of the compute node.

* * * * *